(12) United States Patent
Ito et al.

(10) Patent No.: US 8,280,606 B2
(45) Date of Patent: Oct. 2, 2012

(54) VEHICLE BEHAVIOR CONTROL SYSTEM

(75) Inventors: Yuki Ito, Wako (JP); Osamu Yamamoto, Wako (JP); Naoto Ohkubo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 494 days.

(21) Appl. No.: 12/332,711

(22) Filed: Dec. 11, 2008

(65) Prior Publication Data
US 2009/0157275 A1 Jun. 18, 2009

(30) Foreign Application Priority Data

Dec. 18, 2007 (JP) ................. 2007-326384

(51) Int. Cl.
*B60T 8/24* (2006.01)
*G06F 7/00* (2006.01)
*G06F 17/00* (2006.01)
*G06G 1/00* (2006.01)

(52) U.S. Cl. ............... 701/72; 701/70; 701/71; 701/82; 701/90; 303/154; 303/163

(58) Field of Classification Search ............ 701/36, 701/39, 48, 70–92; 340/467, 507; 303/121, 303/122–122.09, 138–154, 163–185
See application file for complete search history.

(56) References Cited

U.S. PATENT DOCUMENTS

| 6,053,583 | A | 4/2000 | Izumi et al. | |
| 6,216,079 | B1 | 4/2001 | Matsuda | |
| 6,219,610 | B1 | 4/2001 | Araki | |
| 6,266,601 | B1 * | 7/2001 | Soga et al. | 701/74 |
| 6,308,126 | B2 * | 10/2001 | Yokoyama et al. | 701/70 |
| 6,415,215 | B1 * | 7/2002 | Nishizaki et al. | 701/70 |
| 7,558,662 | B2 * | 7/2009 | Yamaguchi et al. | 701/70 |
| 7,580,785 | B2 * | 8/2009 | Matsumoto et al. | 701/70 |
| 7,734,407 | B2 * | 6/2010 | Asano | 701/70 |
| 2008/0300765 | A1 * | 12/2008 | Kato | 701/90 |

FOREIGN PATENT DOCUMENTS

| DE | 102 15 465 | 10/2003 |
| DE | 10 2006 051 908 | 10/2007 |
| JP | 7-117645 | 5/1995 |
| JP | 9020220 | 1/1997 |
| JP | 11059371 | 3/1999 |
| JP | 2000272491 | 10/2000 |
| JP | 2004-284485 | 10/2004 |

* cited by examiner

*Primary Examiner* — Thomas Tarcza
*Assistant Examiner* — Rami Khatib
(74) *Attorney, Agent, or Firm* — Rankin, Hill & Clark LLP

(57) ABSTRACT

A slip angle differential value calculation unit 34 calculates a slip angle differential value of a body of a vehicle, a braking force application prohibiting unit 35 prohibits the application of braking force by a braking force application unit 33 when a yaw rate detection value takes a positive value and the sip angle differential value is a positive judgment threshold or more or when the yaw rate detection value takes a negative value and the slip angle differential value is a negative judgment threshold or less.

2 Claims, 7 Drawing Sheets

VEHICLE BEHAVIOR CONTROL SYSTEM

BACKGROUND OF THE INVENTION

1. Field of the Invention

The present invention relates to a vehicle behavior control apparatus which applies braking force to wheels of the vehicle on an inside of a turning circle in accordance with a difference between the standard yaw rate and the yaw rate detection value at the time of vehicle turning, and more particularly to a technique for suppressing an undesirable vehicle behavior as occurring at the time of failure of the yaw rate detection unit.

2. Description of Related Art

In the event that a vehicle slips sideways or skids in turning due to understeer or oversteer, the vehicle deviates from a target traveling course intended by the driver of the vehicle. To cope with this, a control has been adopted to cause the vehicle to return to its target traveling course by apply brakes on either left wheels or right wheels when it is judged that the vehicle has deviated from the target traveling course.

In this case, the deviation from the target traveling course is normally judged by comparing a standard yaw rate, which is calculated from a vehicle velocity obtained by a vehicle velocity detection unit and a steering angle obtained by a steering angle detection unit, with a yaw rate detection value detected by a yaw rate detection unit.

For example, when a value resulting from subtraction of the yaw rate detection value from the standard yaw rate exceeds an understeer judgment threshold, it is judged that the vehicle is in an understeer state, and then, braking force is imparted to wheels of the vehicle on an internal side of a turning circle. On the contrary, when a value resulting from subtraction of the yaw rate detection value from the standard yaw rate is less than the understeer judgment threshold, it is judged that the vehicle is in an oversteer state, and then, braking force is imparted to wheels of the vehicle on an external side of the turning circle (refer to Japanese Patent Unexamined Publications JP-A-7-117645 and JP-A-2004-284485).

In vehicle behavior control apparatuses disclosed in the JP-A-7-117645 and JP-A-2004-284485, when a yaw rate detection unit or an electronic component within an ECU fails (operation failure or contact failure) while the vehicle is turning, resulting in a yaw rate detection value detected by the yaw rate detection unit becoming too small, it is undesirably judged that the vehicle is in an understeer state. Then, there is a possibility that a relatively strong braking force is imparted to the wheels of the vehicle on an internal side of a turning circle. As this occurs, the vehicle behaves in such a manner as to turn towards the internal side of the turning circle (namely, the vehicle is put in an oversteer state) relative to its target traveling course. Thus, there is a possibility that the driver is forced to perform a countersteer operation or feels an unstable steering feel.

SUMMARY OF THE INVENTION

The invention has been made in view of these situations, and an object thereof is to provide a vehicle behavior control apparatus which can surely prohibit the execution of undesirable understeer suppression control attributed to the failure of a yaw rate detection unit.

In order to attain the above object, according to an aspect of the invention, there is provided a vehicle behavior control apparatus including:

a vehicle body speed detection unit (31) which detects a vehicle velocity of a vehicle (15), a steering angle detection unit (27) which detects a steering angle of a steering wheel (22), a standard yaw rate calculation unit (32) which calculates, based on the vehicle velocity and the steering angle, a standard yaw rate of the vehicle (15) which has a positive or negative sign in accordance with a turning direction of the vehicle, a yaw rate detection unit (28) which detects a yaw rate of the vehicle (15) as a detection value having a positive or negative sign in accordance with a turning direction of the vehicle, and a braking force application unit (33) which applies braking force to wheels of the vehicle (15) on an internal side of a turning circle in accordance with a difference between the standard yaw rate and the yaw rate detection value at the time of vehicle (15) turning, a slip angle differential value calculation unit (34) which calculates a slip angle differential value of the vehicle body; and a braking force application prohibition unit (35) which prohibits the application of a braking force by the braking force application unit (33) when:

the yaw rate detection value is a positive value and the slip angle differential value is a positive judgment threshold or more; or the yaw rate detection value is a negative value and the slip angle differential value is a negative judgment threshold or less.

Further, according to another aspect of the invention, it is adaptable that the vehicle behavior control apparatus further including a lateral acceleration detection unit which detects a lateral acceleration detection value (GL) of the vehicle, and the slip angle differential value calculation unit calculates a slip angle differential value of the vehicle based on the lateral acceleration detection value (GL), the vehicle velocity (V) and the yaw rate detection value ($\gamma$).

Note that a steering angle sensor 27 in an embodiment corresponds to the steering angle detection unit of the invention, and a yaw rate sensor 28 in the embodiment corresponds to the yaw rate detection unit of the invention.

According to the aspects of the invention, even if a too small yaw rate detection value is outputted from the yaw rate detection unit due the failure of the yaw rate detection unit, it is judged whether or not the yaw rate detection value which is too small results from the failure of the yaw rate detection unit by comparing the slip angle differential value of the body with the judgment threshold, in accordance with the comparison, it is prohibited that an unnecessary application of a braking force to the wheels on the internal side of the turning circle by the braking force application unit. Thus, the vehicle behavior to turn towards the internal side of the turning circle relative to the target traveling course can be suppressed.

Moreover, the braking force application prohibition unit prohibits the application of the braking force by the braking force application unit when the yaw rate detection value is a positive value and the slip angle differential value is a positive judgment threshold or more or when the yaw rate detection value is a negative value and the slip angle differential value is a negative judgment threshold or less. Thus, the execution of the understeer suppression control applying the braking force to the wheels on the internal side of the turning circle caused by the malfunction of the yaw rate detection unit is surely avoided. Accordingly, the undesirable application of the braking force attributed to the failure of the yaw rate detection unit can be surely prohibited.

DETAILED DESCRIPTION OF EXEMPLARY EMBODIMENTS OF THE PRESENT INVENTION

Hereinafter, an exemplary embodiment of the invention will be described based on an embodiment of the invention which is shown in accompanying drawings.

FIGS. 1 to 9 show an embodiment of the invention.

Figure 1:
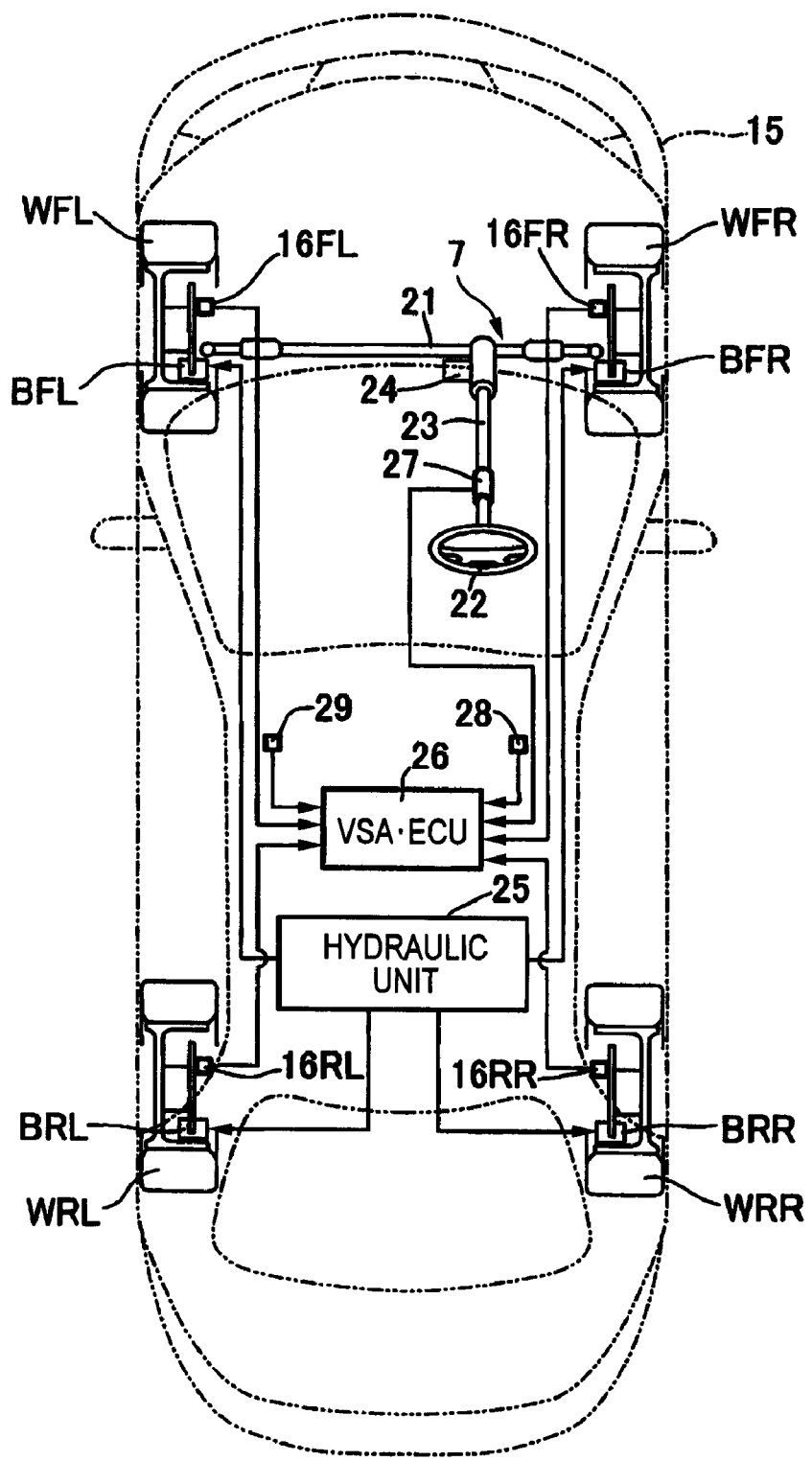
FIG. 1 is a plan view showing a steering system and a brake system of a vehicle.

In FIG. 1, wheel brakes BFL, BFR, BRL, BRR and wheel speed sensors 16FL, 16FR, 16RL, 16RR are mounted, respectively, on left front wheel WFL, a right front wheel WFR, a left rear wheel WRL, and a right rear wheel WRR of a vehicle 15. An Electric Power Steering (hereinafter, referred to as EPS) 17 is connected to the left and right front wheels WFL, WFR.

This EPS 17 is a well known one which has, mainly, a steering gear 21 which is made up of a rack and a pinion, which are not shown, a steering shaft 23 to which a steering wheel 22 is attached, and an EPS motor 24 for imparting a steering assist force to the steering shaft 23.

The respective wheel brakes BFL to BRR are supplied with a hydraulic fluid, and a hydraulic unit 25 has four circuits in which solenoid valves which are PWM controlled and hydraulic circuits are individually associated with the respective wheel brakes BFL to BRR. Thus, the hydraulic fluid can be supplied to the respective wheel brakes BFL to BRR while being pressurized differently.

The operation of the hydraulic unit 25 when the vehicle 15 is turning is controlled by a Vehicle Stability Assist Electric Control Unit (hereinafter, revered to as a VSA-ECU) 26. This VSA-ECU 26 has a microcomputer, an ROM, an RAM, peripheral circuits, an input/output interface and various types drivers.

Detection values of a steering angle sensor 27, a yaw rate sensor 28 and a lateral G sensor 29 are input to the VSA-ECU 26. The steering angle sensor 27 is a steering angle detection unit which is attached to the steering shaft 23 of the EPS 17 for detecting a steering angle of the steering wheel 22. The yaw rate sensor 28 is a yaw rate detection unit for detecting a yaw rate of the vehicle 15 as a yaw rate detection value having a positive or negative sign in accordance with a turning direction of the vehicle. The lateral G sensor 29 detects a lateral acceleration of the vehicle.

Figure 2:
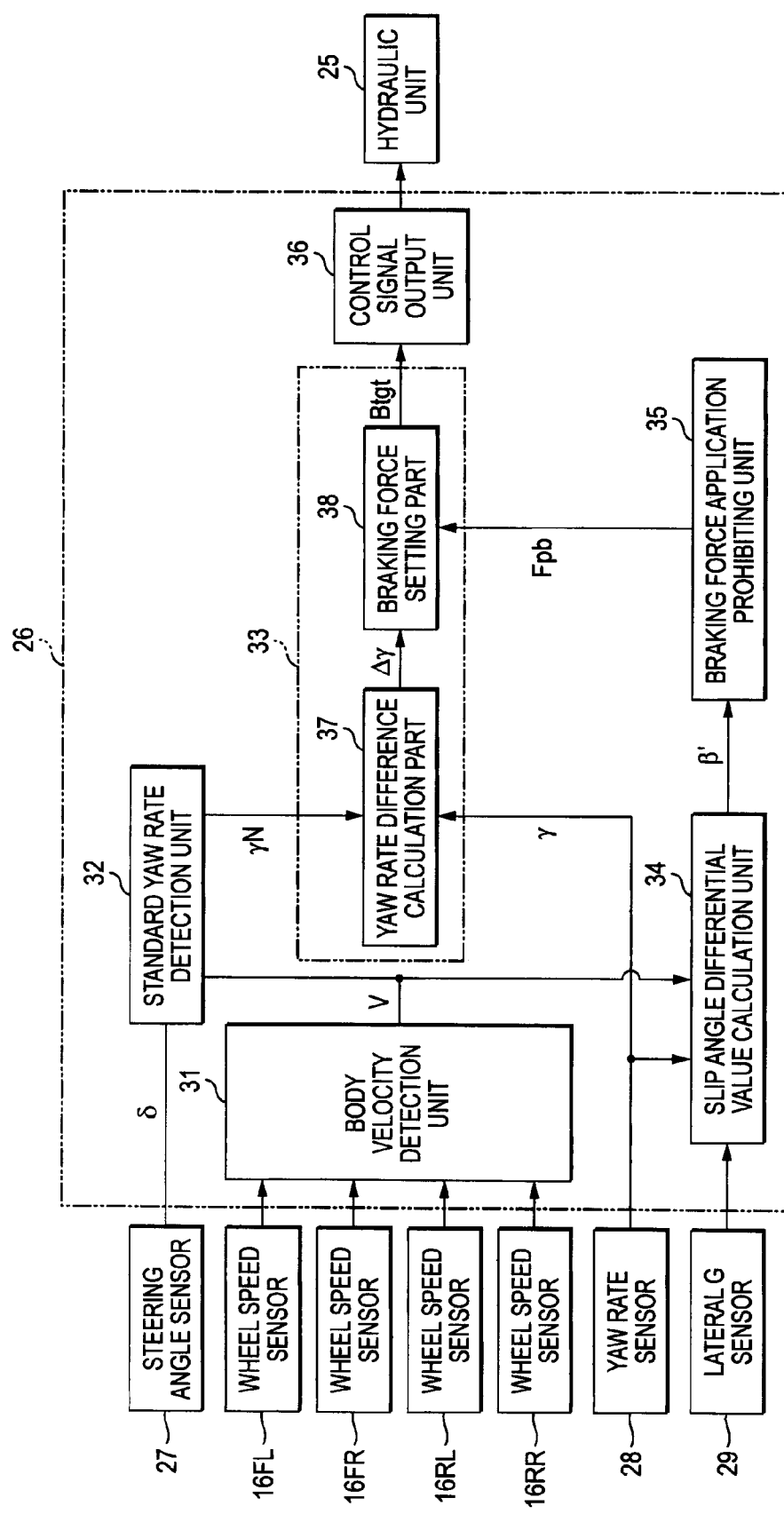
FIG. 2 is a block diagram showing the configuration of a vehicle behavior stabilization control unit.

As shown in FIG. 2, the VSA-ECU 26 includes a vehicle velocity detection unit 31, a standard yaw rate calculation unit 32, a braking force application unit 33, a slip angle differential value calculation unit 34, a braking force application prohibiting unit 35 and a control signal output unit 36.

The vehicle velocity detection unit 31 calculates a vehicle velocity V based on wheel speeds detected by the wheel speed sensors 16FL, 16FR, 16RL, 16RR which are mounted, respectively, on the left front wheel WFL, right front wheel WFR, left rear wheel WRL and right rear wheel WRR. The standard yaw rate calculation unit 32 calculates a standard yaw rate γN having a positive or negative sign in accordance with a turning direction of the vehicle 15 based on the vehicle velocity V obtained by the vehicle velocity detection unit 31 and a steering angle detection value 6 obtained by the steering angle sensor 27.

The braking force application unit 33 has a yaw rate difference calculation part 37 and a braking force setting part 38.

The yaw rate difference calculation part 37 calculates a yaw rate difference Δγ which is a difference between a standard yaw rate γN obtained by the standard yaw rate calculation unit 32 and the yaw rate detection value γ obtained by the yaw rate sensor 28. The braking force setting part 38 sets a target braking force Btgt that is to be applied to the wheels of the left front wheels WFL, right front wheels WRL, left rear wheels WRL and right rear wheel WRR which lie on an internal side of a turning circle in accordance with the result of a calculation in the yaw rate difference calculation part 37. The control signal output unit 36 outputs a signal associated with the target braking force Btgt set in the braking force setting part 38 and inputs into the hydraulic unit 25.

Figure 3:
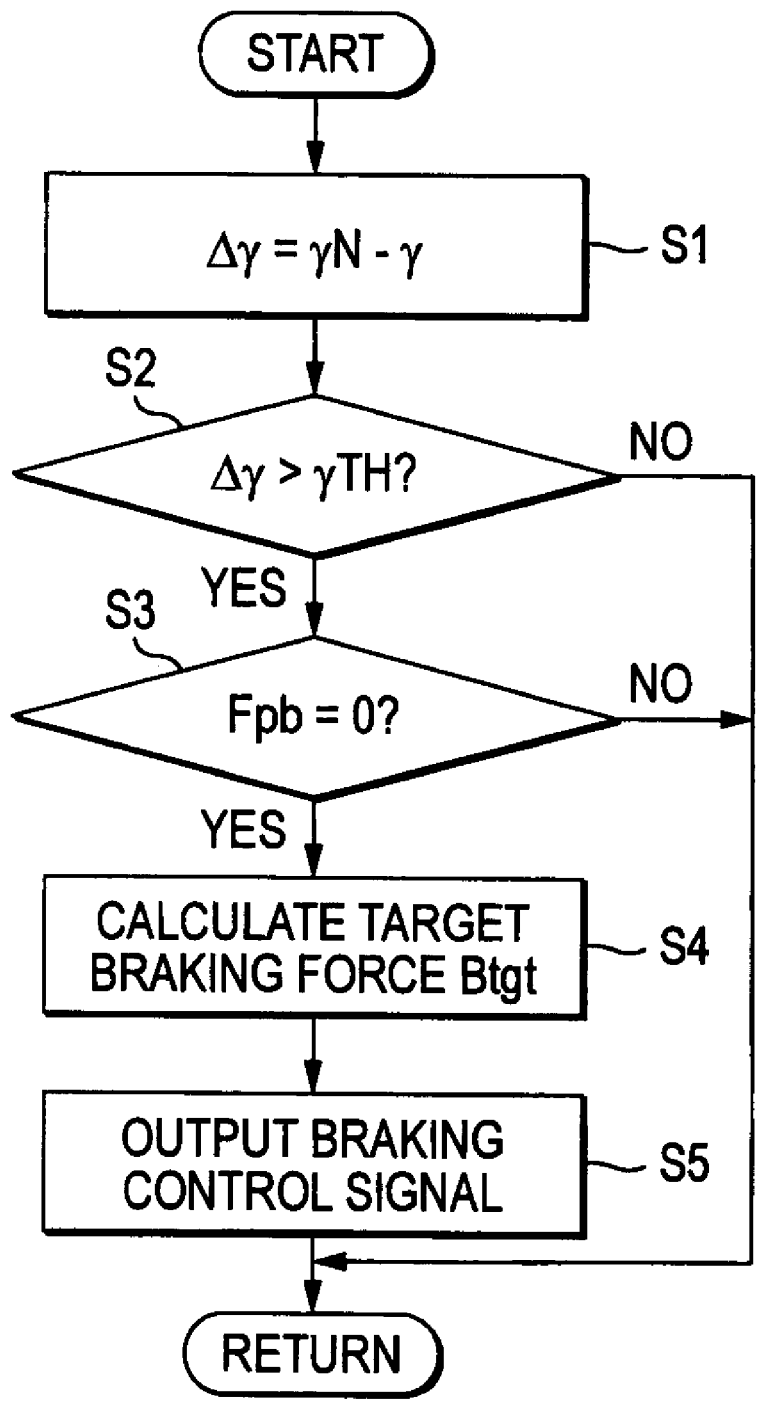
FIG. 3 is a flowchart illustrating a control procedure of an understeer suppression control.

Thus configured braking force application unit 33 executes repeatedly at certain control intervals an understeer suppression control which follows an operation procedure shown in FIG. 3. Firstly, at step S1, the yaw rate detection value γ is subtracted from the standard yaw rate γN so as to calculate a yaw rate difference Δγ, and at step S2, it is judged whether or not the yaw rate difference Δγ exceeds a understeer judgment threshold γth. Note that the understeer judgment threshold γth is set as a relatively small value within a range where no control hunting is produced.

If it is judged at step S2 that Δγ≦γth, the understeer suppression control returns to step S1 without performing any operation. On the other hand, if it is judged at step S2 that the yaw rate detection value γ is different largely from the standard yaw rate γN and that the yaw rate difference Δγ has exceeded the understeer judgment threshold γth (Δγ>γth), the control proceeds to step S3, where it is judged whether or not a braking prohibition flag Fpb based on the result of a judgment by the braking force application prohibiting unit 35 is "0," and if it is judged that Fpb=1, the control also returns to step S1 without performing any operation.

If it is judged at step S3 that Fpb=0, the control proceeds to step S4, where a target braking force Btgt based on the yaw rate difference Δγ is calculated, and at the following step S5, a braking control signal for attaining the target braking force Btgt is outputted to the hydraulic unit 25. Even though the vehicle 15 is put in an understeer state when it is turning, the wheels on the internal side of the turning circle are allowed to be braked in accordance with the intensity (the yaw rate difference Δγ) of understeer through the understeer suppression control described above. Thus, a large deviation of the vehicle 15 from its target traveling course can be suppressed.

Returning to FIG. 2 again, the slip angle differential value calculation unit 34 calculates a body slip angle differential value β' based on the lateral acceleration detection value GL obtained by the lateral G sensor 29, the vehicle velocity V obtained by the vehicle velocity detection unit 31, and the yaw rate detection value γ obtained by the yaw rate sensor 28. The braking force application prohibiting unit 35 outputs a braking prohibition command (the braking prohibition flag Fpb=1) to the braking force setting part 38 of the braking force application unit 33 in accordance with the result of a calculation by the slip angle differential value calculation unit 34.

Figure 4:
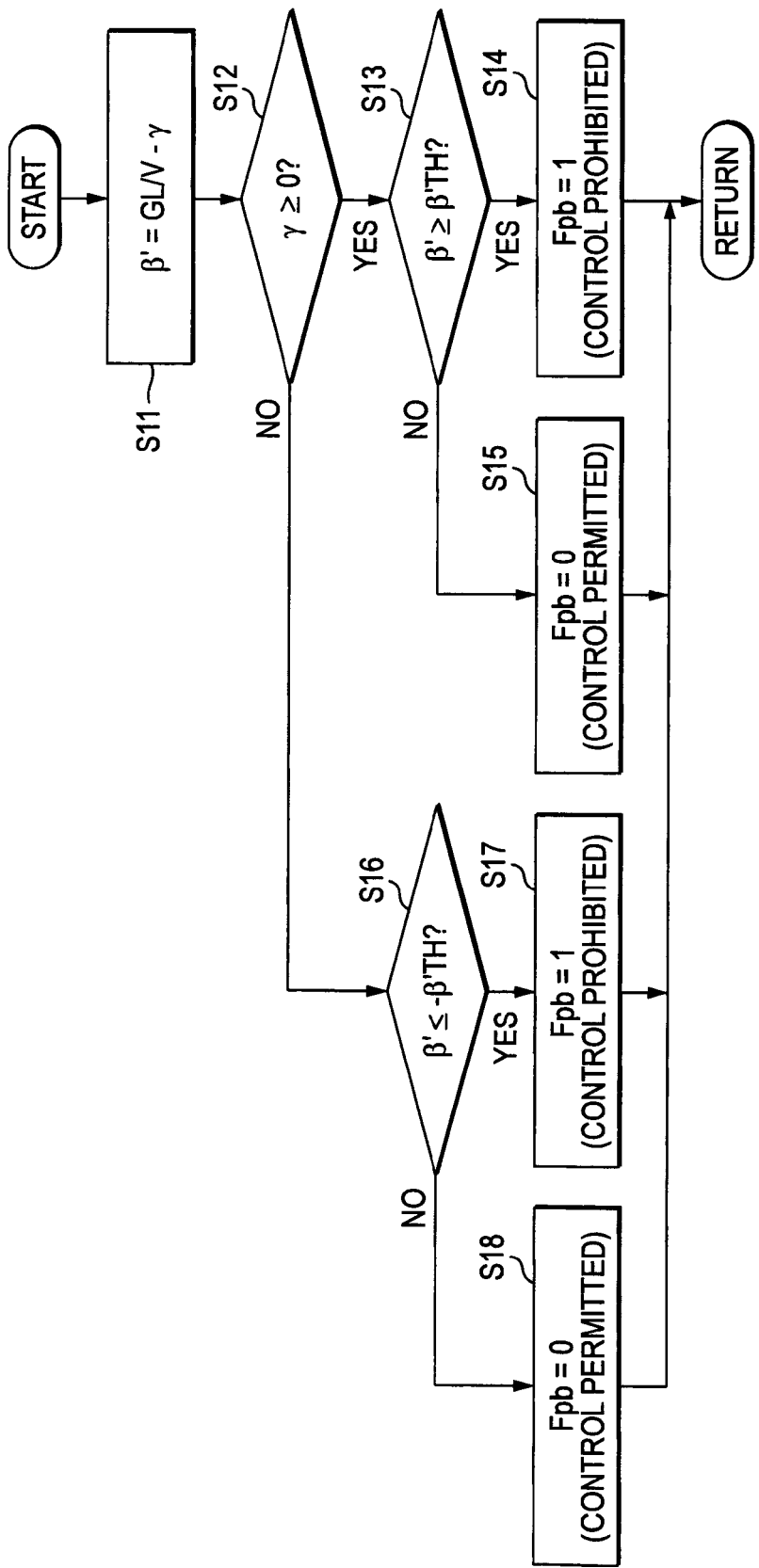
FIG. 4 is a flowchart illustrating a procedure of a braking prohibition judgment control.

The slip angle differential value calculation unit 34 and the braking force application prohibiting unit 35 execute a braking prohibition judgment operation which follows an operation procedure shown in FIG. 4 repeatedly at prejudged control intervals in parallel with the understeer suppression control illustrated in FIG. 3. Firstly, at step S11, by the use of the lateral acceleration detection value GL, the vehicle velocity V and the yaw rate detection value γ, a slip angle differential value β' is calculated based on the following expression (1).

$$\beta' = GL/V - \gamma \qquad (1)$$

Note that the above expression (1) is induced from the following motion equation, and in the equation, m denotes an inertial mass of the vehicle.

$$mV(\beta' + \gamma) = m/GL$$

At the following step S12, the turning direction of the vehicle is judged, that is, it is judged whether the vehicle 15 is turning left or right. Assuming that the yaw rate detection value γ having a positive sign denotes a left turn, while the yaw rate detection value γ having a negative sign denotes a right turn, if it is judged that γ≧0, that is, the vehicle is turning left, at step S13, it is judged whether or not the slip angle differential value β' is a positive judgment threshold "β'th" or more and if β'≧β40 th, at step S14, the braking prohibition flag Fpb is set to "1" to prohibit the understeer suppression control. In contrast, if it is judged at step S13 that β'<β'th, at step S15, the braking prohibition flag Fpb is set to "0" to permit the understeer suppression control.

In addition, if it is judged at step S12 that γ<0, that is, the vehicle is turning right, the control jumps from step S12 to step S16, where whether or not the slip angle differential value β' is a negative judgment threshold "-β'th" or less and if it is judged that β'≦-β'th, at step S17, the braking prohibition flag Fpb is set to "1" to prohibit the understeer suppression control. In contrast, if it is judged at step S16 that β'>-β'th, at step S18, the braking prohibition flag Fpb is set to "0" to permit the understeer suppression control.

Namely, the braking force application prohibiting unit 35 sets the braking prohibition flag Fpb to "1" to prohibit the application of braking force by the braking force application unit 33 when the slip angle differential value β' calculated by the slip angle differential value calculation unit 34 is the positive judgment threshold "β'th" or more and the yaw rate detection value γ detected by the yaw rate sensor 28 is a positive value, (that is, the vehicle is turning left) or when the slip angle differential value β' is the negative judgment threshold "-β'th" or less and the yaw rate detection value γ is a negative value (that is, the vehicle is turning right).

Figure 5:
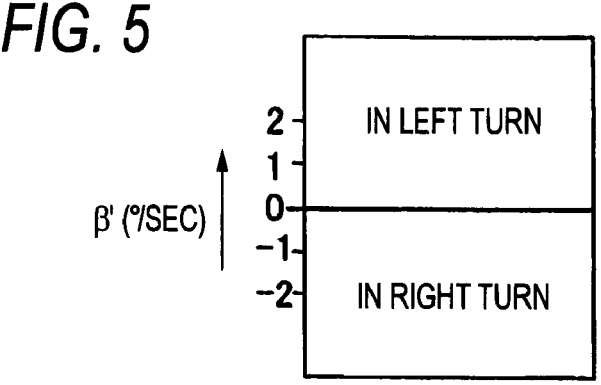
FIG. 5 is a drawing showing values that a slip angle differential value can take in such a state that a yaw rate sensor fails.
Figure 6:
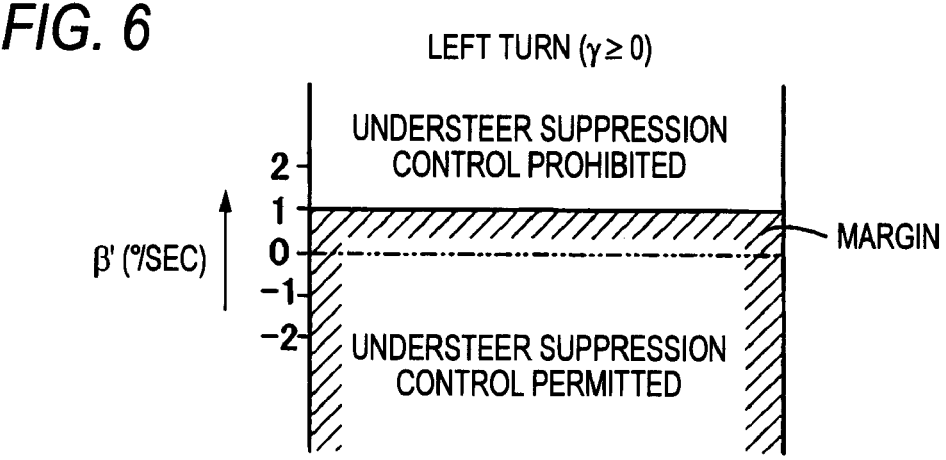
FIG. 6 is a drawing showing an understeer suppression control permissive area and an understeer suppression control prohibiting area when the vehicle is turning left.
Figure 7:
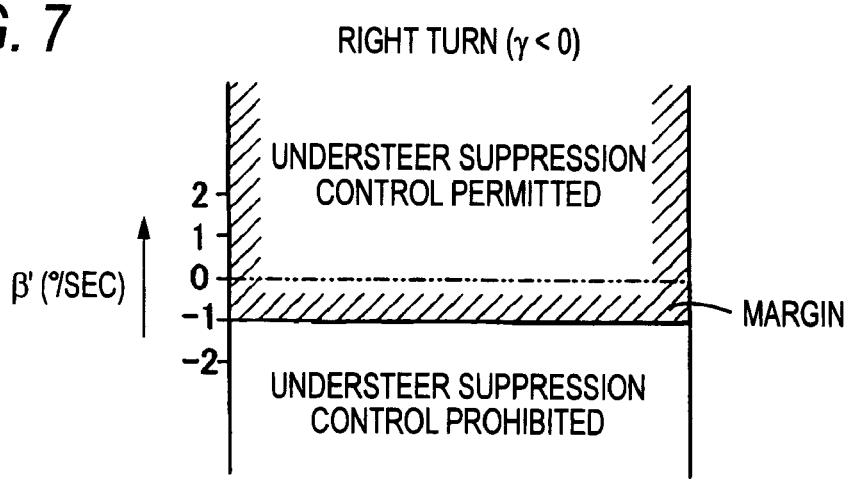
FIG. 7 is a drawing showing an understeer suppression control permissive area and an understeer suppression control prohibiting area when the vehicle is turning right.

Here, in the understeer state, when the understeer suppression control is erroneously executed due the yaw rate sensor 28 outputting a too small value as a result of failure thereof, as is shown in FIG. 5, the slip angle differential value β' takes a value equal to or larger than "0" when the vehicle is turning left, while it takes a value smaller than "0" when the vehicle is turning right, and the judgment threshold β'th may only have to be set to a value which is as close to "0" as possible. However, in this embodiment, by setting a margin in consideration of noise or the like, when the vehicle 15 is tuning left, as is shown in FIG. 6, the positive judgment threshold "β'th" is set to "1" and when the vehicle is turning right, as is shown in FIG. 7, the negative judgment threshold "-β'th" is set to "-1."

Next, the function of the embodiment will be described. When a too small yaw rate detection value γ is outputted from the yaw rate sensor 28 due to the yaw rate sensor 28 failing, it is judged through comparison with the judgment thresholds "βth," "-β'th" of the slip angle differential value β' of the body whether or not the output of such a value is due to the failure of the yaw rate sensor 28. Then, an unnecessary application of braking force by the braking force application unit 33 to the wheels lying on the internal side of the turning circle is prohibited. Accordingly, the behavior of the vehicle to turn towards the inside of the turning circle is suppressed.

Figure 8:
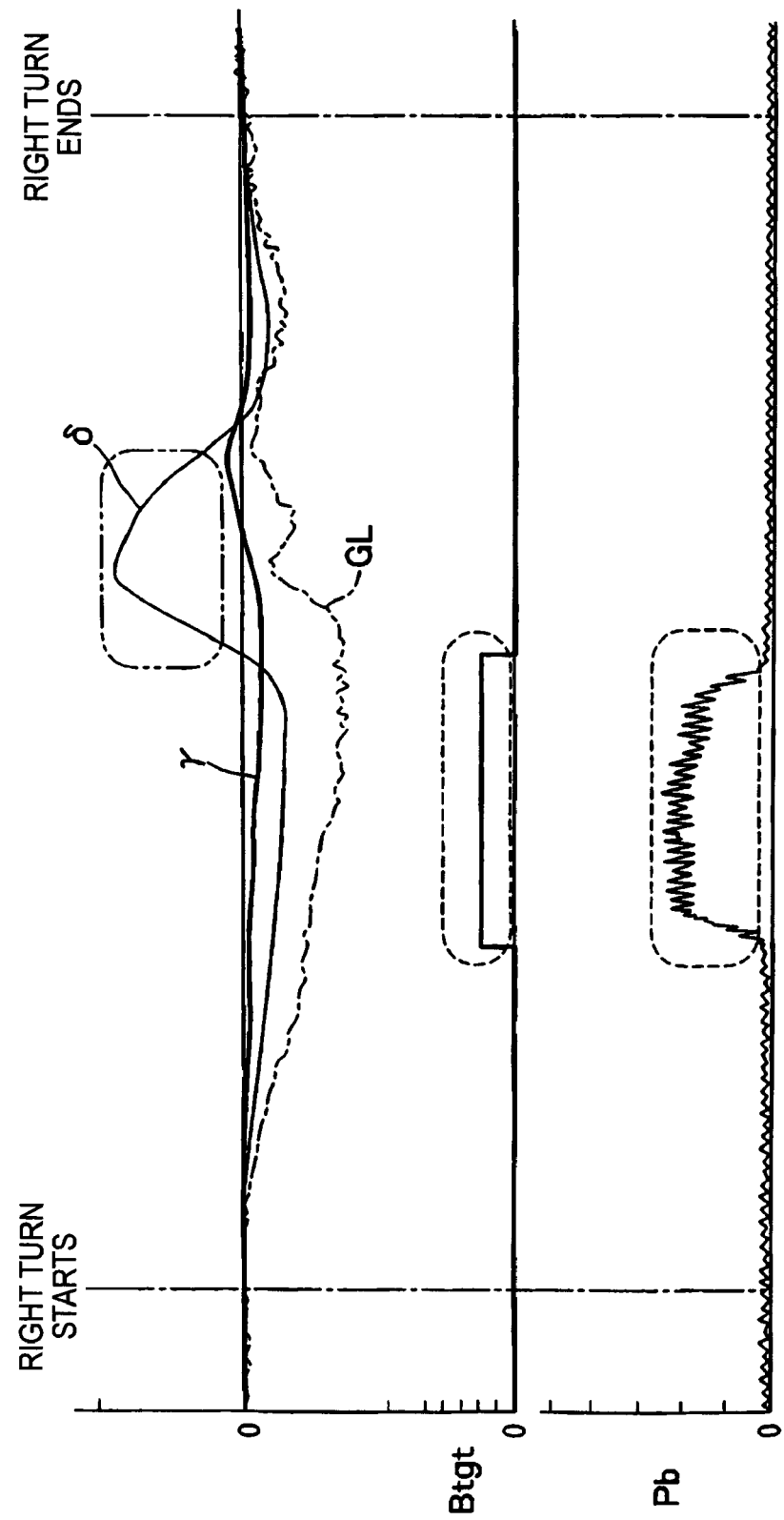
FIG. 8 is a time chart resulting when a braking prohibition judgment control is not executed.

An example is shown in FIG. 8 in which the yaw rate detection value γ, the steering angle detection value δ, the lateral acceleration detection value GL, the target braking force Btgt and a brake hydraulic pressure Pb change with time when the yaw rate detection value γ becomes on the order of 10% of the actual yaw rate due to the yaw rate sensor 28 failing while the vehicle 15 is turning right with the braking prohibition judgment control not executed.

As is clear from FIG. 8, when the yaw rate detection value γ changes little to remain a small value, while the lateral acceleration GL increases due to the failure of the yaw rate sensor 28 while the vehicle is turning right, there may occur a case where the yaw rate difference Δγ exceeds the understeer judgment threshold γth. As this occurs, in a part surrounded by a broken line in FIG. 8, the target braking force Btgt and the brake hydraulic pressure Pb increase, whereby the wheels on the internal side of the turning circle are braked, and a spin moment directed towards the inside of the turning circle acts, thereby the vehicle 15 being put in the oversteer state or spin state. Then, in the example shown in FIG. 8, to suppress the spin of the vehicle, the driver turns the steering wheel in the opposite direction, that is, performs a countersteer operation in an area surrounded by a chain double-dashed line in FIG. 8.

Figure 9:
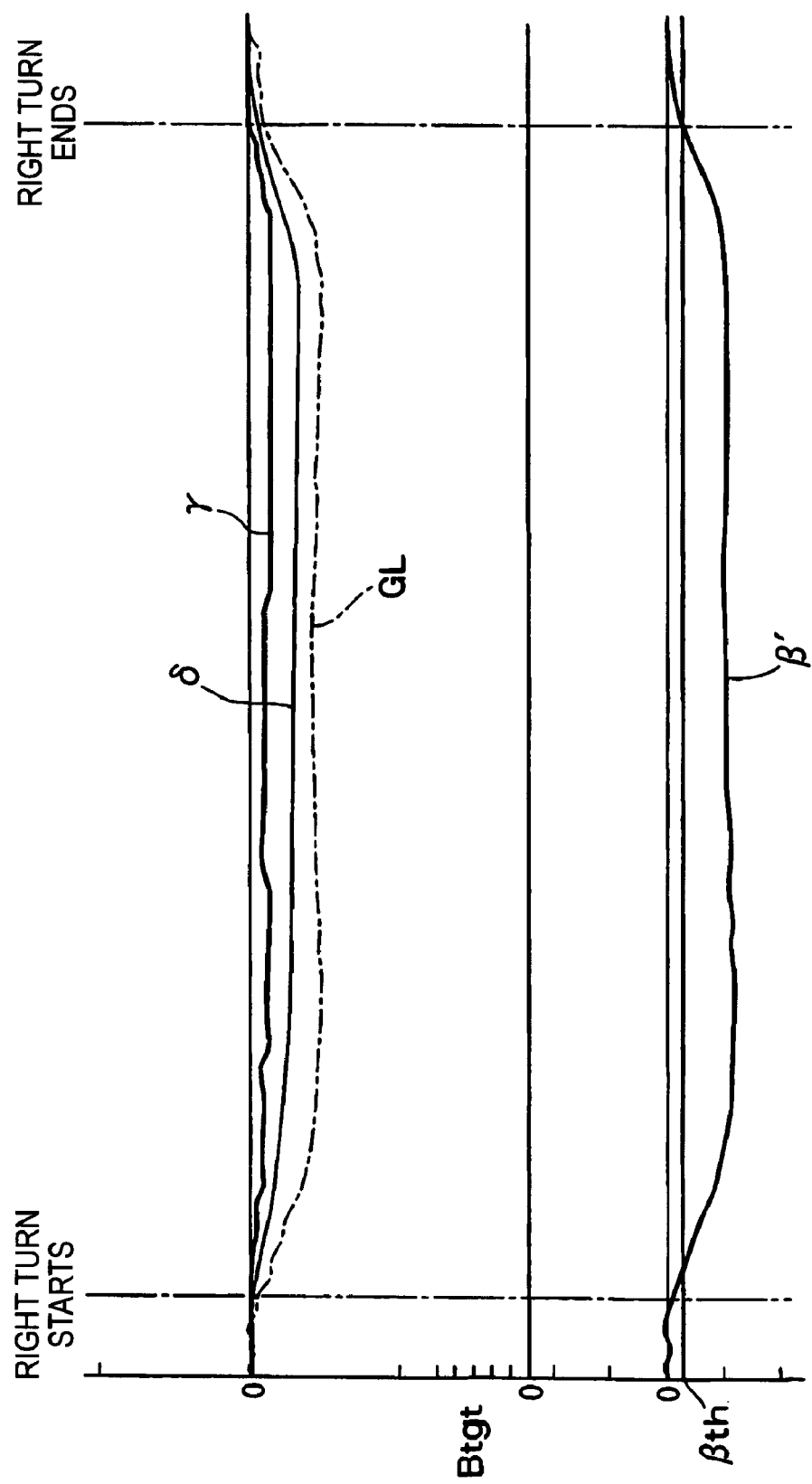
FIG. 9 is a time chart resulting in such a state that the braking prohibition judgment control is executed.

FIG. 9 shows an example in which the yaw rate detection value γ, the steering angle detection value δ, the lateral acceleration detection value GL, the target braking force Btgt and the brake hydraulic pressure Pb change with time, when the yaw rate detection value γ becomes on the order of 10% of the actual yaw rate due to the yaw rate sensor 28 failing while the vehicle 15 is turning right with the braking prohibition judgment control executed according to the invention.

As is clear from FIG. 9, when the yaw rate detection value γ changes little to remain a small value, while the lateral acceleration GL increases due to the failure of the yaw rate sensor 28 while the vehicle is turning right, as with what has been described above, there may occur a case where the yaw rate difference Δγ exceeds the understeer judgment threshold γth. However, since the braking prohibition judgment control is executed, the understeer control through application of brakes to the wheels on the internal side of the turning circle through comparison of the judgment thresholds "β'th," "-β'th" of the slip angle judgment value β'. Therefore, the target braking force Btgt remain "0", thereby no spin moment directed to the inside of the turning circle is applied to the vehicle.

As a result, being different from the case where no braking prohibition judgment control is not performed, the vehicle 15 is prevented from being put in the oversteer state or the spin state, an extremely stable turn can be realized.

Moreover, since the braking force application prohibiting unit 35 prohibits the application of braking force by the braking force application unit 33 when the yaw rate detection value γ detected by the yaw rate sensor 28 takes a positive value and the slip angle differential value β' is the positive judgment threshold "β'th" or more, or when the yaw rate detection sensor 28 takes a negative value and the slip angle differential value β' is the negative judgment threshold "−β'th" or less, the understeer suppression control to apply a braking force to the wheels on the internal side of the turning circle executed due to the failure of the yaw rate sensor 28 can be surely avoided. Thus, it possible to surely prohibit an undesirable understeer suppression control attributed to the failure of the yaw rate sensor 28.

Thus, while the embodiment of the invention has been described, needless to say, the invention is not limited to the embodiment described heretofore and hence can be modified in design in various ways without departing from the spirit and scope of the invention described in the claims thereof.

While the invention has been described in connection with the exemplary embodiments, it will be obvious to those skilled in the art that various changes and modifications may be made therein without departing from the present invention, and it is aimed, therefore, to cover in the appended claim all such changes and modifications as fall within the true spirit and scope of the present invention.

What is claimed is:

1. A vehicle behavior control apparatus comprising:
   a vehicle body speed detection unit configured to detect a vehicle velocity of a vehicle
   a steering angle detection unit configured to detect a steering angle of a steering wheel
   a standard yaw rate calculation unit configured to calculate, based on the vehicle velocity and the steering angle, a standard yaw rate of the vehicle which has a positive or negative sign in accordance with a turning direction of the vehicle,
   a yaw rate detection unit configured to detect a yaw rate of the vehicle as a detection value having a positive or negative sign in accordance with a turning direction of the vehicle, and
   a braking force application unit configured to apply braking force to wheels of the vehicle on an internal side of a turning circle in accordance with a difference between the standard yaw rate and the yaw rate detection value at the time of vehicle turning,
   a lateral acceleration detection unit configured to detect a lateral acceleration detection value of the vehicle,
   a slip angle differential value calculation unit configured to calculate a slip angle differential value of the vehicle body by subtracting the yaw rate detection value from a value of the lateral acceleration direction value divided by the vehicle velocity; and
   a braking force application prohibition unit configured to prohibit the application of a braking force by the braking force application unit when:
   the yaw rate detection value is a negative value and the slip angle differential value is equal to or less than a negative judgment threshold.

2. The vehicle behavior control apparatus of claim 1, wherein the slip angle differential value is a vehicle slip angle differential value.

* * * * *